(12) United States Patent
Sarkis

(10) Patent No.: US 8,487,255 B2
(45) Date of Patent: Jul. 16, 2013

(54) PASSIVE RADIOMETRIC IMAGING DEVICE AND METHOD

(75) Inventor: Michel Sarkis, Stuttgart (DE)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 13/005,973

(22) Filed: Jan. 13, 2011

(65) Prior Publication Data

US 2011/0181461 A1 Jul. 28, 2011

(30) Foreign Application Priority Data

Jan. 22, 2010 (EP) .................................... 10151457

(51) Int. Cl.
*G01T 1/00* (2006.01)
(52) U.S. Cl.
USPC ...................................................... 250/336.1
(58) Field of Classification Search
USPC ...................................................... 250/336.1
See application file for complete search history.

(56) References Cited

U.S. PATENT DOCUMENTS

| 5,717,789 | A | 2/1998 | Anderson et al. | |
|---|---|---|---|---|
| 6,837,617 | B1 * | 1/2005 | Koltunov et al. | 374/121 |
| 2007/0221847 | A1 | 9/2007 | Lettington et al. | |
| 2011/0019935 | A1 * | 1/2011 | Kelm et al. | 382/275 |

OTHER PUBLICATIONS

U.S. Appl. No. 13/343,507, filed Jan. 4, 2012, Sarkis.
Leonid I. Rudin, et al., "Nonlinear total variation based noise removal algorithms", Physica D 60, 1992, pp. 259-268.
Guy Gilboa, et al., "Texture Preserving Variational Denoising Using an Adaptive Fidelity Term", in IEEE Workshop on Variational Geometric and Level Set Methods in Computer Vision, Oct. 2003, 8 pages.
Hayit Greenspan, et al., "Image Enhancement by Nonlinear Extrapolation in Frequency Space", IEEE Transactions on Image Processing, vol. 9, No. 6, Jun. 2000, pp. 1035-1048.
Florian Luisier, et al., "A New SURE Approach to Image Denoising: Interscale Orthonormal Wavelet Thresholding", IEEE Transactions on Image Processing, vol. 16, No. 3, Mar. 2007, pp. 593-606.
Rongjie Shi, et al., "Image Denoising Through Locally Linear Embedding", in International Conference on Computer Graphics, Imaging Visualisation, Jul. 2005, 6 pages.
Antoni Buades, et al., "A non-local algorithm for image denoising", in IEEE Conference on Computer Vision and Pattern Recognition, Jun. 2005, 6 pages.

(Continued)

*Primary Examiner* — David Porta
*Assistant Examiner* — Hugh H Maupin
(74) *Attorney, Agent, or Firm* — Oblon, Spivak, McClelland, Maier & Neustadt, L.L.P.

(57) ABSTRACT

The present invention relates to a passive radiometric imaging device and a corresponding method for scanning a scene and reconstructing an image of said scene. To provide an improved image quality, the proposed device comprises a radiometer configured to detect radiation emitted in a predetermined spectral range from a plurality of spots of said scene to obtain a data set of radiation samples including at least one radiation sample per spot, and a processor configured to subsequently determine pixel values of pixels of the image to be reconstructed, said processor being configured to determine a pixel value of one of said pixels from a data sub-set of radiation samples from said data set, said data sub-set including the radiation samples detected at the spot corresponding to or being closest to the pixel, whose pixel value is to be determined, and/or radiation samples detected at neighboring spots.

24 Claims, 11 Drawing Sheets

OTHER PUBLICATIONS

Michael Elad, et al., "Image Denoising Via Learned Dictionaries and Sparse representation", in IEEE Conference on Computer Vision and Pattern Recognition, Jun. 2006, 6 pages.

Ming Zhang, et al., "Multiresolution Bilateral Filtering for Image Denoising", IEEE Transactions on Image Processing, vol. 17, No. 12, Dec. 2008, pp. 2324-2333.

D. Tschumperle, et al., "Non-Local Image Smoothing by Applying Anisotropic Diffusion PDE's in the Space of Patches", in IEEE International Conference on Image Processing, Nov. 2009, pp. 2957-2960.

Irfan T. Butt, et al., "Multilateral Filtering: A Novel Framework for Generic Similarity-Based Image Denoising", in IEEE International Conference on Image Processing, Nov. 2009, pp. 2981-2984.

Federico Tombari, et al., "Classification and evaluation of cost aggregation methods for stereo crorrespondence", in IEEE Conference on Computer Vision and Pattern Recognition, Jun. 2008, pp. 1-8.

Oliver Schall, et al., "Sparse Meshing of Uncertain and Noisy Surface Scattered Data," Research Report, Max—Planck—Institut Fuer Informatik, Feb. 2005, 23 pages.

Yutaka Ohtake, et al., "An Integrating Approach to Meshing Scattered Point Data," in ACM Symposium on Solid and Physical Modeling, Jun. 2005, pp. 61-69.

Carlos Wai Yin Leung, "Efficient Methods for 3D Reconstruction from Multiple Images", A thesis submitted to the University of Queensland for the degree of Doctor of Philosophy School of Information Technology and Electrical Engineering, Feb. 2006, 263 pages.

Yuri Boykov, et al., "Fast Approximate Energy Minimization via Graph Cuts", IEEE Transactions on Pattern Analysis and Machine Intelligence, vol. 23, No. 11, Nov. 2001, pp. 1222-1239.

Pedro F. Felzenszwalb, et al., "Efficient Belief Propagation for Early Vision", International Journal of Computer Vision, Oct. 2006, 26 pages.

Sylvain Paris, et al., "A Fast Approximation of the Bilateral Filter using a Signal Processing Approach", in European Conference on Computer Vision, May 2006, 12 pages.

Joachim Weickert, et al., "A Scheme for Coherence-Enhancing Diffusion Filtering with Optimized Rotation Invariance," Journal of Visual Communication and Image Representation 13, Mar. 2002, pp. 103-118.

R. K. Beatson, et al., "Multiquadric B-splines", Journal of Approximation Theory 87, Oct. 1996, pp. 1-24.

* cited by examiner

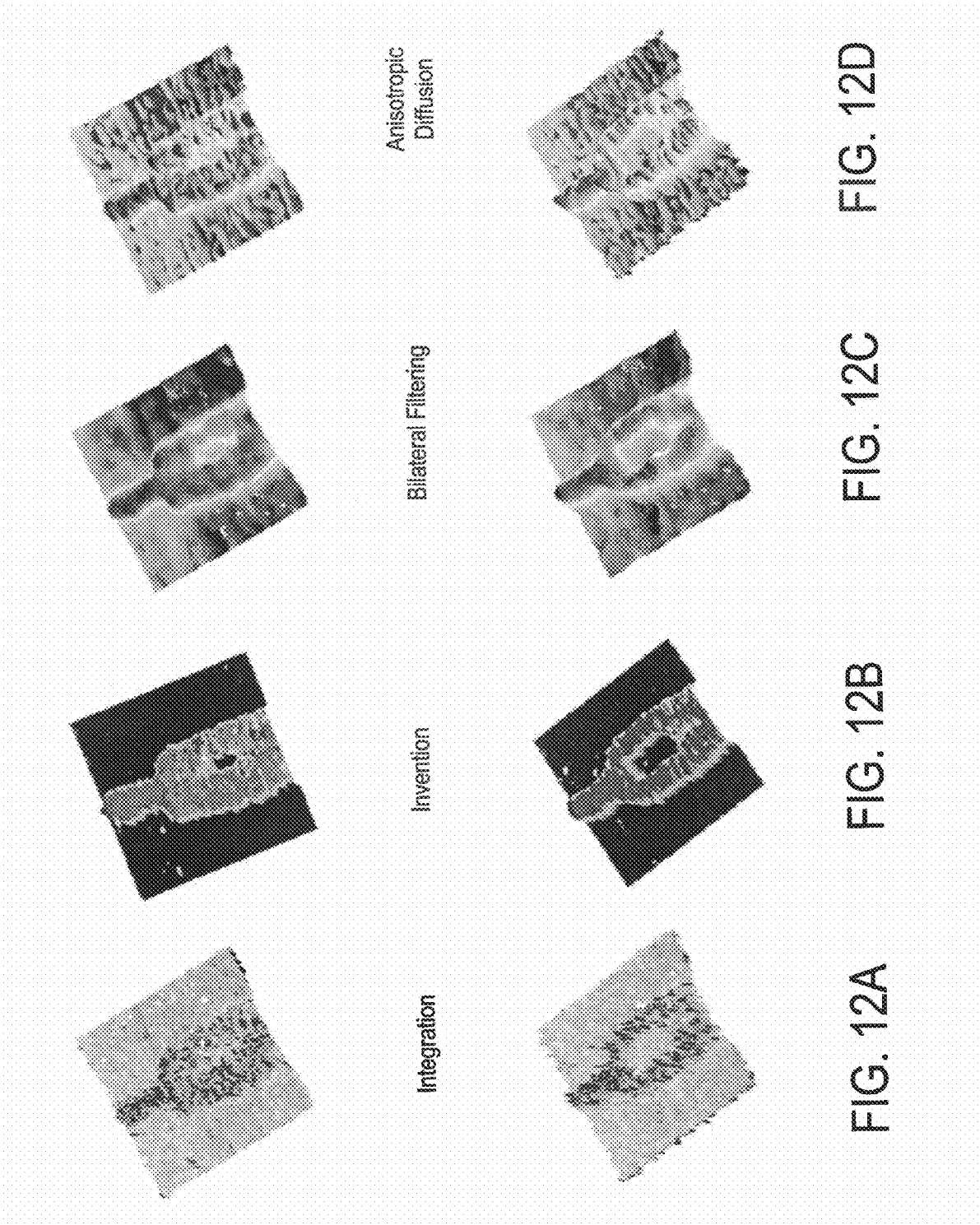

PASSIVE RADIOMETRIC IMAGING DEVICE AND METHOD

CROSS-REFERENCE TO RELATED APPLICATIONS

This application claims priority of European patent application 10 151 457.8 filed on Jan. 22, 2010.

FIELD OF THE INVENTION

The present invention relates to a passive radiometric imaging device and a corresponding method for scanning a scene and reconstructing an image of said scene. Further, the present invention relates to a processing apparatus and a corresponding processing method for use in a passive radiometric imaging device. Still further, the present invention relates to a computer program for implementing said processing method on a computer.

BACKGROUND OF THE INVENTION

Electromagnetic waves are classified into several types depending on the wave frequency. These waves have been applied to a lot of applications like in-vehicle radar devices for measuring the distance between moving vehicles in order to prevent collisions, in concealed weapon detection, or in detecting malignant cells. Further, improved generation and detection techniques as well as latest improvements in the integration and miniaturization of devices operating at various frequency ranges have created a lot of interest to exploit the properties of this electromagnetic radiation. Examples are millimeter and sub-millimeter waves (30 GHz to a few THz) which have the ability to penetrate non-metal materials, including plastics, walls, clothes, smoke and fog.

Electromagnetic waves can be used in an active or a passive mode. A passive radiometric imaging system creates images by capturing the electromagnetic radiation emitted by the objects by using a radiometer. Such a passive radiometric imaging system is, for instance, known from US 2007/0221847 A1.

Passive electromagnetic waves are emitted naturally by any object. The strengths of these waves depend on the object itself. These signals are, however, weak and are degraded fast due to both the internal noise factors of the radiometer and the external noise factors of the environment. Therefore, the radiation samples of the passive electromagnetic waves captured by the radiometer are generally degraded by high noise variations.

Conventionally, in passive radiometric imaging devices it is tried to employ image de-noising and enhancement algorithms to reduce the effect of the noisy images obtained from the sensor (i.e. the radiometer). Such de-noising or enhancement algorithms can be based on image wavelets, on the Total Variation principle, on manifold learning algorithms, on filtering schemes like wiener or bilateral filtering, on diffusion algorithms or on image pyramids in combination with extrapolation in the frequency space. Many other techniques exist as a state of the art. However, all of these algorithms are mainly designed as a post-processing step of the noisy radiometer image. In other words, such algorithms do not directly process the radiometric samples when recovering the radiometer image, but they enhance, improve or de-noise an integrated image from all the samples of the radiometer by using an algorithm like one of the just mentioned algorithms.

Further, these techniques can suppress the noise to some extent but the resulting image will suffer from a lot of fluctuations due to the high variation of noise and interference at the sensor, especially in passive radiometers, in which the signal to noise ratio is low.

As a result, the obtained image after reconstruction will be degraded. This will make the applications of the passive radiometric imaging device for object detection in security screening applications a difficult task. This is mainly due to the degraded nature of the image that can result either in false alarms or in some suspicious objects being missed from the screening.

BRIEF SUMMARY OF THE INVENTION

It is an object of the present invention to provide a passive radiometric imaging device and a corresponding method for imaging a scene providing a better image quality compared to known passive radiometric imaging devices and methods. Preferably, the proposed device and method should adapt to the radiation signals, withstand the noise and enforce the properties of radiometric surfaces in the resulting reconstructed image.

It is a further object of the present invention to provide a processing apparatus and a corresponding processing method for use in a passive radiometric imaging device, as well as to provide a corresponding computer program for implementing said processing method.

According to an aspect of the present invention there is provided a passive radiometric imaging device for scanning a scene and reconstructing an image of said scene, said device comprising:

a radiometer configured to detect radiation emitted in a predetermined spectral range from a plurality of spots of said scene to obtain a data set of radiation samples including at least one radiation sample per spot, and a processor configured to subsequently determine pixel values of pixels of the image to be reconstructed, said processing means being configured to determine a pixel value of one of said pixels from a data sub-set of radiation samples from said data set, said data sub-set including the radiation samples detected at the spot corresponding to or being closest to the pixel, whose pixel value is to be determined, and/or radiation samples detected at neighboring spots.

According to a further aspect of the present invention there is provided a processing apparatus, in particular for use in a passive radiometric imaging device, said processing apparatus comprising a processor for subsequently determining pixel values of pixels of the image to be reconstructed, said processor being configured to determine a pixel value of one of said pixels from a data sub-set of radiation samples from a data set of radiation samples including at least one radiation sample per spot, said radiation samples being obtained by detecting radiation emitted in a predetermined spectral range from a plurality of spots of said scene, wherein said data sub-set includes the radiation samples detected at the spot corresponding to or being closest to the pixel, whose pixel value is to be determined, and/or radiation samples detected at neighboring spots.

According to further aspects of the present invention there are provided a corresponding passive radiometric imaging method and a corresponding processing method.

According to still a further aspect of the present invention there is provided a computer program comprising program means for causing a computer to carry out the steps of the processing method, when said computer program is carried out on a computer.

Preferred embodiments of the invention are defined in the dependent claims. It shall be understood that the claimed processing apparatus, processing method, passive radiometric imaging method and the claimed computer program have similar and/or identical preferred embodiments as the claimed passive radiometric imaging device and as defined in the dependent claims.

The present invention is based on the idea to take account of the favorable property of a radiometric surface which is generally a piece-wise smooth surface. The variation of the surface within an object in the image is smooth. The jumps and the high variations happen at the edges of the scene captured by the radiometer. Hence, according to the present invention all the radiation samples detected by the radiometer are taken into account depending on the sampling rate and the objective image resolution. Further, according to the present invention the properties of the radiometric surface are taken into account when calculating the pixel values of the pixels of the image. Said pixel values may then directly form the image or may be further processed for reconstructing the image, which, preferably, is simultaneously de-noised or enhanced.

According to another aspect of the present invention there is provided a passive radiometric imaging device for scanning a scene and reconstructing an image of said scene, said device comprising:
a radiation detection means for detecting radiation emitted in a predetermined spectral range from a plurality of spots of said scene to obtain a data set of radiation samples including at least one radiation sample per spot, and
a processing means for subsequently determining pixel values of pixels of the image to be reconstructed, said processing means being adapted for determining a pixel value of one of said pixels from a data sub-set of radiation samples from said data set, said data sub-set including the radiation samples detected at the spot corresponding to or being closest to the pixel, whose pixel value is to be determined, and/or radiation samples detected at neighboring spots.

According to a further aspect of the present invention there is provided a processing apparatus, in particular for use in a passive radiometric imaging device, said processing apparatus comprising a processing means for subsequently determining pixel values of pixels of the image to be reconstructed, said processing means being adapted for determining a pixel value of one of said pixels from a data sub-set of radiation samples from a data set of radiation samples including at least one radiation sample per spot, said radiation samples being obtained by detecting radiation emitted in a predetermined spectral range from a plurality of spots of said scene, wherein said data sub-set includes the radiation samples detected at the spot corresponding to or being closest to the pixel, whose pixel value is to be determined, and/or radiation samples detected at neighboring spots.

BRIEF DESCRIPTION OF DRAWINGS

These and other aspects of the present invention will be apparent from and explained in more detail below with reference to the embodiments described hereinafter. In the following drawings FIG. 12 shows images obtained with the present invention compared to images obtained by known methods.

DETAILED DESCRIPTION OF THE INVENTION

Figure 1:
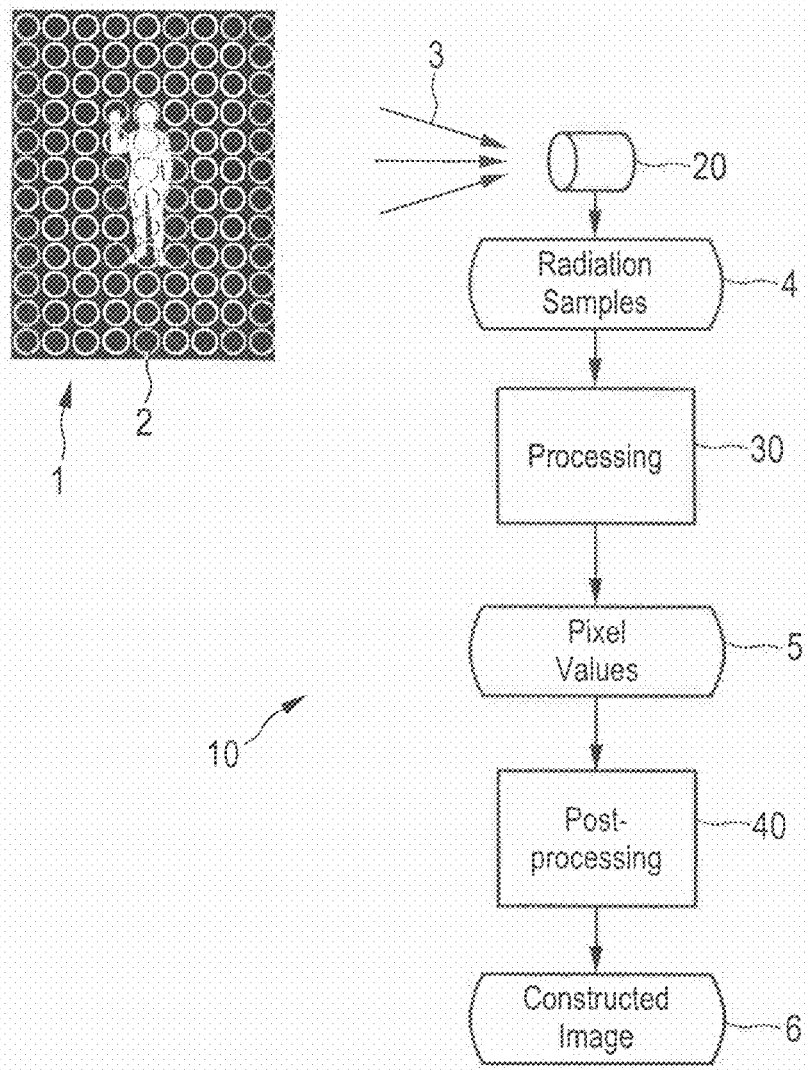
FIG. 1 shows a block diagram of the general layout of a passive radiometric imaging device according to the present invention.

In the following, details and different embodiments of the invention are explained. FIG. 1 shows a block diagram of the general layout of the passive radiometric imaging device 10 according to the present invention. The electromagnetic waves can generally be in any range (microwave, millimeter, sub-millimeter or other spectral ranges) emitted from a scene, e.g. a person standing in front of a wall, are captured by a radiometer 20. Generally, by the radiometer 20 radiation 3 emitted from a plurality of spots 2 of said scene 1 is acquired to obtain a data set of radiation samples 4 including at least one radiation sample per spot 2.

Generally, the radiometer 20 comprises a single radiometer unit by which the scene is scanned spot by spot. Thus, depending on the integration time of the radiometer unit, from each spot one or more radiation samples are obtained. For scanning over the scene 1 the radiometer 20, or at least its antenna, is mechanically moved along a predetermined trajectory, e.g. in a meandering scheme, over the scene 1. In other embodiments, the sensitivity profile of the radiometer can be electronically moved over the scene 1. In further embodiments, sensing the scene 1 is done by placing a static or a moving reflector next to the radiometer 20. The radiometer 20 may also comprise two or more radiometer units, which can simultaneously detect radiation from two or more radiation spots so that scanning time can be decreased. These and other embodiments of a passive radiometer 20 are generally known and will thus not be explained in more detail in this application.

Generally, pixels of the image to be reconstructed should coincide with the spots 2, at which the radiation samples 5 have been acquired, so that a data sub-set comprises the radiation samples detected at the spot, which coincides with the pixel, and the radiation samples of neighboring spots. In practical implementations, this condition is not always completely satisfied, and thus creating a noisy image if the samples are simply integrated. This also proofs that there is a need for a solution as proposed by the invention to compensate for this disadvantage.

Therefore, the data set of radiation samples 4, which may be stored in a storage unit (not shown), is processed by a processing unit 30 for subsequently determining their contribution to the reconstruction of each of the pixel values 5 of pixels of the image to be reconstructed. Thereby, each pixel of the pixel values 5 is determined from a data sub-set (also called "patch") of radiation samples 4 from said data set, wherein a data subset includes all the radiation samples detected at the spot corresponding to or being closest to the pixel, for which the pixel value shall be determined, and the radiation samples detected at neighboring spots. The contribution of each sample of the sub-set is determined in the said sub-set of the samples. It shall be noted that the determination of the pixel values can be done serially, in parallel, or in a mixed structure.

The determined pixel values 5 either directly represent the pixels of the image, which can thus be, for instance, displayed on a monitor. Alternatively or in addition, a post-processing unit 40 may optionally be provided for post-processing an image 6 from the determined pixel values 5, e.g. using image processing tools such as interpolation or de-blurring.

Thus, the constructed image 6 may simply a depiction of the determined pixel values 5 of all the pixels. However, other embodiments for post-processing the determined pixel values and/or the image are possible, and it is, for instance, also possible to generate an image from more or less pixel, wherein more pixels may be generated by known interpolation of available pixel values 5 and wherein less pixels may be generated by combination and/or averaging of pixel values 5 generated by the processing unit 30.

Since, as mentioned above, according to the present invention the properties of the radiometric surfaces are taken into account when reconstructing the image and since directly the (raw) radiation samples are processed and not the integrated image, the obtained images have a better quality than images obtained with conventional passive radiometric imaging devices and methods. In particular, the images have more contrast, less noise and the shapes of the objects are much more preserved and less varying. This allows a better post-analysis of the radiometric image for various applications, e.g. security applications for weapon detection at an airport.

Figure 2:
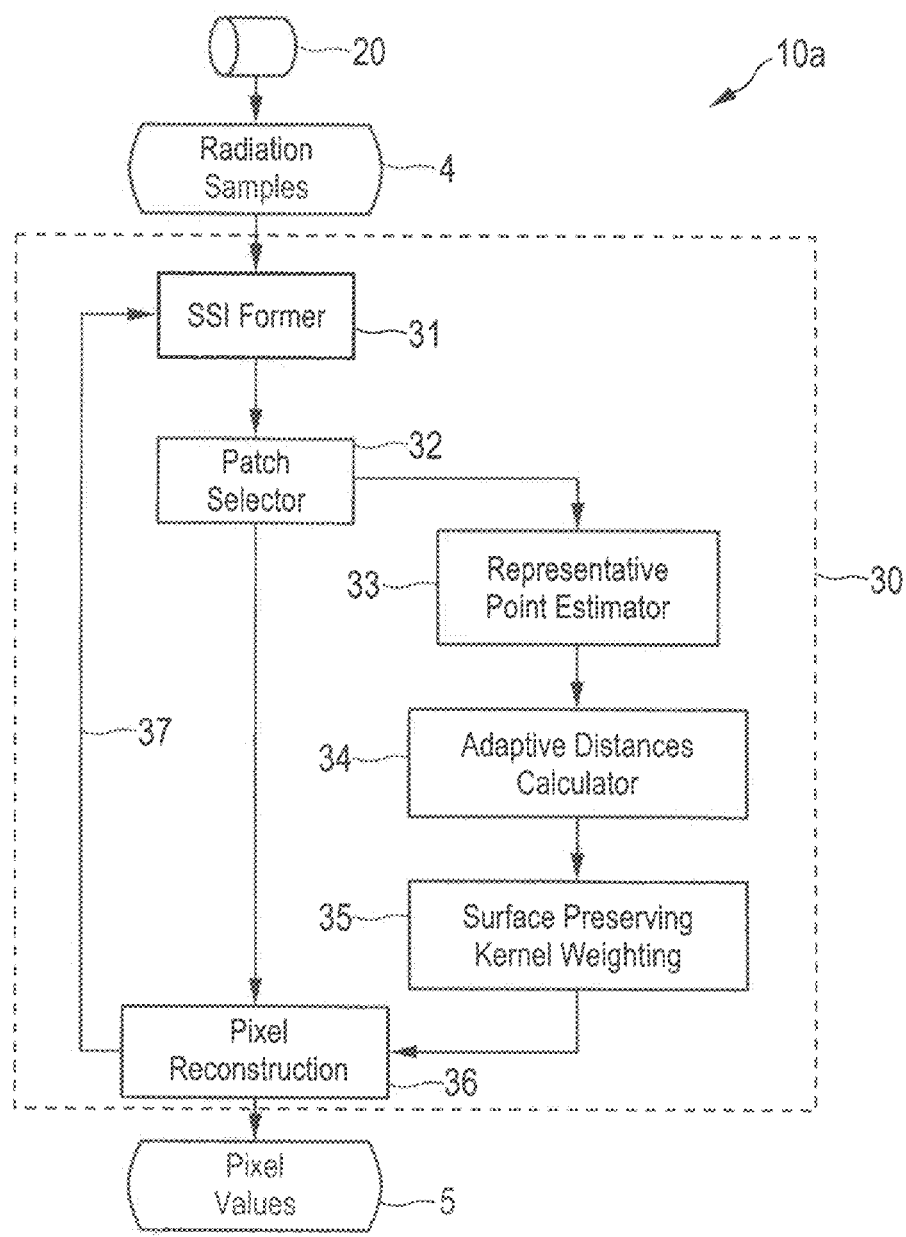
FIG. 2 shows a first embodiment of a device according to the present invention.

A first embodiment of a passive radiometric imaging device 10a according to the present invention is shown in FIG. 2. In this embodiment, the radiation samples 4 of the scene 1 are stored in the samples storage of the radiometric imaging device. The stored samples of the radiometer are preferred to be standardized in the sense that they are centered and normalized by the standard deviation. The standardization (or normalization), sometimes referred to as whitening, is not generally required according to the invention, but is a preferred pre-processing step to stabilize the numerical computations of the image reconstruction from the radiometer 20 since it creates the possibility to filter out some noise. The standardization usually retains the number of samples obtained from the radiometer and it is a reversible operation. It simply centers and normalizes the values of these samples to create numerical stability. Unlike the integration process of the samples which results in one value for each pixel, the original values of the samples after standardization can be recovered back from the mean and the standard deviation.

Figure 3:
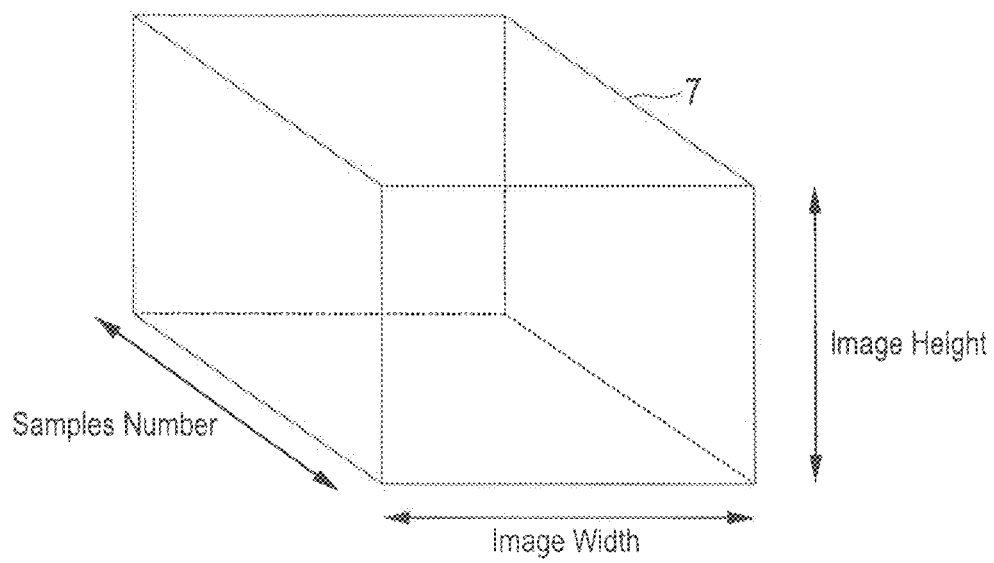
FIG. 3 shows a three-dimensional sample space image formed from the obtained radiation samples.

Then, depending on the image resolution to be reconstructed and the sampling rate of the radiometer 20, the radiation samples 4 are mapped into a sample space image (SSI) using a SSI former 31. An example SSI 7 is shown in FIG. 3. Here in this embodiment the SSI 7 is a three-dimensional (3D) space (or data set) which has the dimensions of the width and the height of the output image and the number of radiation samples of each pixel. In case each pixel has only one sample, the SSI will become of two-dimensions (2D), i.e. a two-dimensional data set. In case more than one radiometer units are used for acquisition of the radiation samples 4, the SSI 7 can also be extended to more than 3D to accommodate the multiple sensors (radiometer units) jointly and/or to other factors like time. For simplicity, in the following, the case of having a single radiometer unit and having multiple samples per pixel will be explained as an example but is not designated to limit the scope of this invention.

Once the SSI 7 is formed, the aim of the next processing steps becomes finding the piece-wise smooth curve (which can also be regarded as an image) within the radiation samples of the SSI 7 that best describes the scene under consideration from all the radiation samples 4 in the SSI 7. Thereby, it is kept in mind, however, that the radiometric scene 1 is a piece-wise smooth surface. This is justified since the radiation emitted from any real-life object has smooth variations within the geometric edges. The abrupt jumps or discontinuities can generally only be found at the edges of the object; therefore, each piece (surface) is smooth and this is why it is designated by a piecewise-smooth surface. Therefore, in order to construct or reconstruct (both terms are interchangeably used throughout this application, and using one these terms shall not be understood such that the meaning of the other term is excluded) the image according to the present invention, this constraint will be taken into account in the reconstruction process, which is one of the elements, by which the invention distinguishes from the known methods.

To reconstruct a pixel of the radiometric image, all the corresponding samples of the pixel in the SSI 7 under consideration, i.e. all the samples obtained at the spot, whose position corresponds to the position of the pixel or is closest to the position of the pixel, are used. Although one possible embodiment of the invention is to take only the samples of the pixel itself or only the samples of the neighboring spots (pixels), it is preferred according to embodiments of the present invention to take the samples of the pixel to be reconstructed and the neighboring samples into account when reconstructing the pixel value. Hence, in a preferred embodiment the samples of the pixel to be reconstructed itself are used in addition to the sample values of neighboring spots (pixels), preferably of all neighboring spots (pixels). Thus, a patch selector 32 is provided for assigning a patch 8 for each pixel, whose pixel values is just to be computed, that includes the samples of the pixel along with all the neighboring samples in the SSI 7. Such a patch 8 can be regarded as a data sub-set of the (complete) data set represented by the SSI 7.

Figure 4:
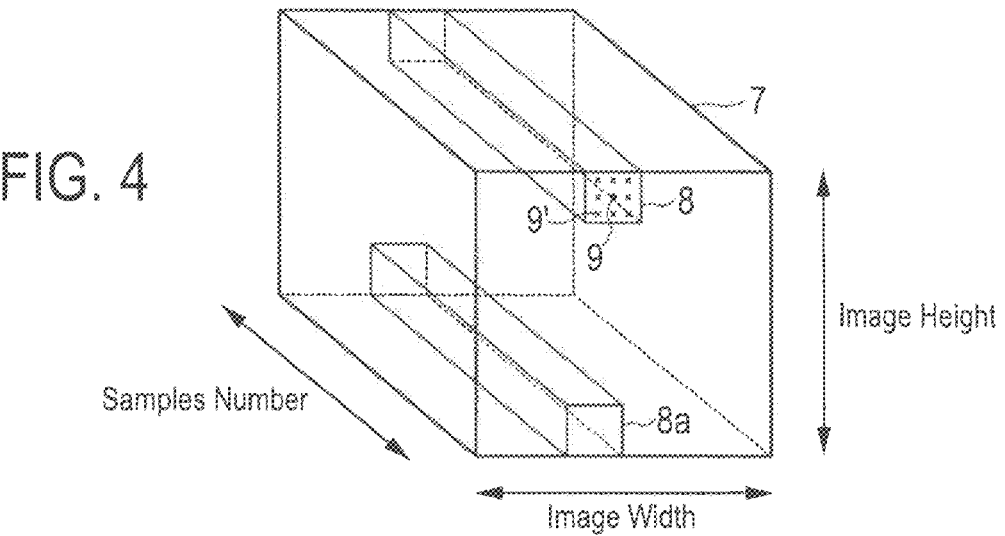
FIG. 4 shows a first embodiment of patches formed in the sample space image.

In the simplest embodiment, the patch around each pixel can be uniform in size by using a pre-defined fix-window size. An example of such a patch 8 is shown in FIG. 4. In this embodiment the patch 8 around each pixel will have the form of a cuboid in the 3D space that contains all the samples of the pixel 9 itself (indicated by a dot) and those of the neighboring pixels 9' (indicated by a cross). In case there is only a single radiation sample per pixel, the cuboid reduces to a square window. In case only the samples of the pixel itself are taken, the patch will be a one dimensional array along the depth (all the samples of the pixel value to be reconstructed).

Figure 5:
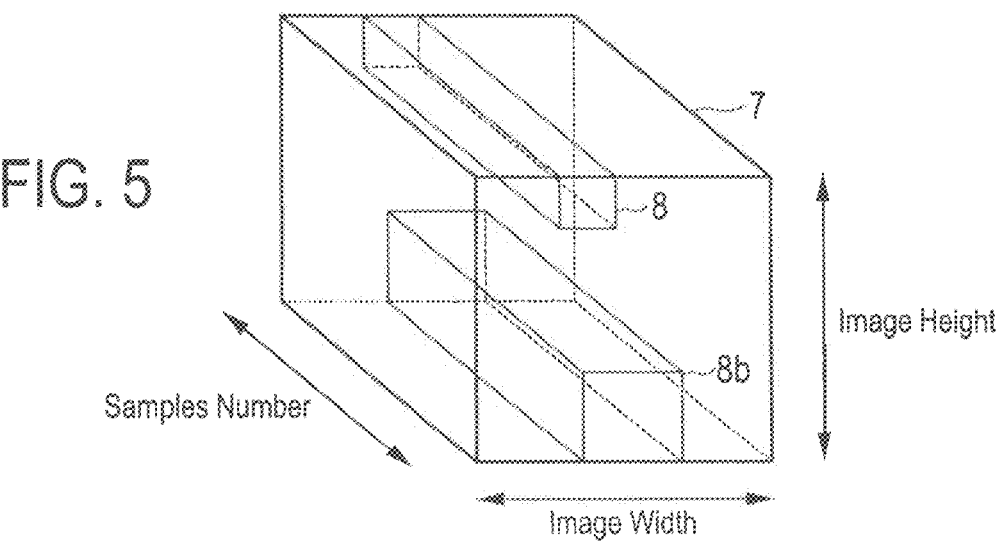
FIG. 5 shows a second embodiment of patches selected in the sample space image.

Further, in the embodiment shown in FIG. 4 the size of the cuboid 8 is the same across all the pixels as shown by the two exemplary cuboids 8 and 8a. In another embodiment, as shown in FIG. 5, the size of the patch, in particular its cross section in a plane parallel to the plane spanned by the image width and image height varies depending on the location of the pixel under consideration in the SSI as shown two the exemplary cuboids 8 and 8b. In this case the dimensions of the cube differ depending on the location of the pixel, and the form of the patch may also vary from a cuboid, depending on the algorithm used for computing the significant neighbors of the pixel under consideration.

In the previous case, the patch selector 32 then computes the neighbors around each pixel. These neighbors can be referred to also as the optimal neighbors that mostly corresponds to the pixel itself or the segment to which it belongs. In other words, optimal neighbors are considered to be neighbors that the samples of the pixel values are as close together as possible. Example algorithms that can be used for this purpose are variable windows, segment support or similar techniques. In the first one, windows of several sizes and shapes are defined around each pixel. The window that best describes the region around the pixel is then chosen as the patch. In the second one, the SSI is segmented or clustered into several regions. Then, the segment to which the pixel belongs is chosen as the patch. More details about these two algorithms and a summary of schemes that can be applied to determine an optimal patch 8 in the SSI 7 can be found, for example, in F. Tombari, S. Mattoccia, and L. Di Stefano, "Classification and evaluation of cost aggregation methods for stereo correspondence", IEEE Conference on Computer Vision and Pattern Recognition, pp. 1-8, June 2008. It should, however, be noted that these algorithms are not the only ones that can be used to determine the adaptive or optimal patch of each pixel.

Using patches, it is possible to reduce the noise effect since the pixel value will be computed in correspondence with its neighboring pixels as usually done in any filtering scheme. According to this embodiment of the present invention surface reconstruction kernels are applied to reconstruct the pixel values of the radiometric image. To do that, several steps are performed in this embodiment. As shown in FIG. 2, once the patch 8 for the pixel to be computed is assigned, at least one representative point is determined for all the samples in the patch 8 by a representative point estimator 33. Each representative point is a reference point which is used to assign the weights of each sample when reconstructing the pixel values of the image. In other words, it is used to compute its distance from the samples to adapt the weight of each sample of the patch in the pixel reconstruction process using some filtering or surface preserving smoothing kernels. In the following, we will limit the description of the invention to one representative point. The accommodation of more than one representative point is, however, also possible according to the invention.

Let $X_i$ be the value of a sample in the patch 8, let N be the number of the overall samples in the patch 8 and let R be the value of the representative point. In this preferred embodiment of the invention, the value of one representative point R is the magnitude of the centroid. It is given by $$R = \left| \frac{1}{N} \sum_{i=1}^{N} X_i \right|. \quad (1)$$

Taking the magnitude of the centroid of the patch 8 is the preferred embodiment of the invention since it is simple and fast. In other embodiments of the invention, as will be explained below, the data can be transformed and will have complex values. In case no such transformations are done to the data, the value of the centroid can be used as an alternative embodiment. It is also possible to use as different embodiments the median or its magnitude; however, the magnitude of the centroid gives an improved performance over them and is the preferred embodiment. It is also possible to apply other methods as alternative embodiments to calculate a representative point of the patch. One alternative embodiment is to take cluster the data in the SSI as generally described in O. Schall, A. Belyaev, and H. P. Seidel, "Sparse meshing of uncertain and noisy surface scattered data," Technical Report, Max-Planck-Institut Für Informatik, February 2005. Other alternative embodiment uses the center of the sphere that contains the most of the points of the patch in the SSI as generally described in Y. Ohtake, A. Belyaev, and H. P. Seidel, "An integrating approach to meshing scattered point data," in ACM Symposium on Solid and Physical Modelling, pp. 61-69, June 2005. However, these embodiments are not the only ones that can be used to calculate the representative point of each patch, but any algorithm with the goal to find a reference point of the patch can generally be applied.

Each representative point will now be used by an adaptive distance calculator 34 to determine the distances, also called adaptive distances since they will be used to adapt the weight of each sample in the reconstruction process using the surface preserving smoothing kernels. The weights will actually be applied to compute the values of the pixels in the radiometer image. The distance $d_i$ of any point $X_i$ in the SSI 7 to the representative point R is given by $$d_i = |R - X_i|. \quad (2)$$

The distance can also be defined by the squared difference between R and $X_i$, as in $(R-X_i)^2$. Other equivalent similarity measures can be also applied. Since the samples are noisy and varying, it is better to regularize the distances so as to prevent extreme values that can bias the computations. An example preferred embodiment is to use the truncated version of the distance $\hat{d}_i$ to enhance the quality of the reconstructed image. By using this preferred embodiment, extreme values of the distances can be cut off The truncated distance is given by $$\hat{d} = \min(d_i, c) \quad (3)$$

where c is a real constant representing the truncation value. Typical values of c are in the range between 0 and 2 if the data of the radiometer is standardized. Otherwise, the value of c can be adapted depending on the samples output of the radiometer. The truncation value can be preset across the whole patches 8 of the SSI 7 or computed adaptively depending on the statistics of the SSI 7 or the patch 8 itself; one example is the standard deviation. Other variations on how to compute c can also be used according to the invention.

The truncated distance presents the preferred embodiment of the invention, but other embodiments are also possible as long as they try to regularize the distances like the truncated distances do. One alternative embodiment is the Potts model which assigns two values for the distances depending if they are below or above a certain threshold similar to c. Another alternative embodiment is to assign three values of the distances depending on two threshold values of the distances $K_1$ and $K_2$, where $K_1 \leq K_2$. In other words, the distances will have a value $V_1$ if a distance is less than $K_1$, $V_2$ if it is between $K_1$ and $K_2$ and $V_3$ if the distance is larger than $K_2$. More details on these functions can be found in in C. Leung, "Efficient methods for 3D reconstruction from multiple image", Chapter 4, pp. 109-112, PhD thesis, University of Queensland, February 2006. It is to be noted again, however, that these alternative embodiments are not the only possible ones, but others can be used as long as they tend to regularize the distances.

The adaptive distances are now used to determine the weights that will be used to reconstruct the pixel value of the radiometric image by a weighing factor calculation unit 35. The weights that should be used according to this embodiment should preserve the smoothness and the structure of the radiometric image. In other words, it should ensure that the radiometric surface properties are taken into account in the reconstructed pixel values. In general, the weight for a radiation sample is determined based on its similarity to the representative point, in particular by assigning a higher weight with increasing similarity or a lower distance. Therefore, the weights in general should be defined as a function inversely proportional to the distances. The higher the distance is, the more the noise content is in the sample. Hence, the weight of sample in the reconstruction process should be smaller. In general, the weight of the sample should be defined as $$K_i = \frac{Q}{f(\hat{d})} \quad (3a)$$

where $K_i$ is the weight of the sample in the reconstruction process, Q can be a function of $\hat{d}$ or a scalar and $f(\hat{d})$ is a function of $\hat{d}$. It should be noted that this equation can be applied directly to the distances d as well if no regularization is done to the distances.

As one preferred embodiment, the general multiquadric spline smoothing kernel, as for instance described in R. K. Beatson and N. Dyn, "Multiquadric b-splines", Journal of Approximation Theory, pp. 1-24, October 1996, to reconstruct these weights. The multiquadric spline kernel will define the weights $K_i$ in equation (4). It is given at each sample $X_i$ of a patch as a function of the distance $d_i$ (or preferably its truncated version $\hat{d}_i$) by $$K_i = n \cdot A(n) \cdot l^{2n} \cdot \left(\hat{d}_i^2 + l^2\right)^{-\frac{2n-1}{2}}, \quad (4)$$

where l is a pre-defined real constant. Lower values of l will result in a smoother image while larger values of l will result in a noisier image. A typical value for l is between 0 and 2 if the data of the radiometer is standardized. However, other values can be used depending on the data output of the radiometer. Further, 2n is the order of the polynomial of the multiquadric spline, n being a positive integer. A typical value of n is in the range between 3 and 7. However, the value of n can be used depending on the data output of the radiometer. Higher values of n will lead to smoother surfaces and vice versa. A is the function defined by $$A(n) = \frac{(2n-1)!!}{2n!!} = \frac{1 \times 3 \times 5 \times \ldots \times (2n-1)}{2 \times 4 \times 6 \times \ldots \times (2n)}. \quad (5)$$

Other smoothing kernels can also be used according to the present invention as long as they take the properties of the radiometric surface into account, when reconstructing the image from the radiation samples. In addition, the embodiment should satisfy equation (3a). One alternative embodiment to the multiquadric splines is the kernel of the bilateral filter which is defined by applying two Gaussian filters to all of the samples of the patch in the SSI. Embodiments with other kernels can be used as long as they take the properties of the radiometric surface into account when reconstructing the image and satisfy equation (3a).

In a preferred embodiment of the invention, the weight of each sample in the patch 8 is normalized with the sum of all the weights in the patch to obtain the normalized weight $\hat{K}_i$ in the form $$\hat{K}_i = \frac{K_i}{\sum_{j=1}^{N} K_j}, \quad (6)$$

where N is the total number of samples in the patch 8.

If more than one reference point is used for each patch, as proposed according to another embodiment, each sample will have more than one weight depending on the number or reference points used. In the most simple embodiment, the final weight of each sample can be simply taken by combining the weights together to produce a single weight by an averaging or a voting scheme or by adapting the reconstruction unit (described below) to use more than one weight for each sample in the reconstruction of each pixel value of the pixel values of the image.

Finally, the weights of each sample along with the samples of the patch 8 are entered to the pixel reconstruction unit 36. In this unit the value of each pixel of the radiometric image is reconstructed from these two inputs (weights and samples). Then, in a preferred embodiment, the constructed values of the pixels are preferably fed back via a feedback loop 37 to the SSI 7 to update it and use it in the computation of the subsequent pixel values of the other pixels of the radiometric image. Once the pixel values for all pixels have been determined in this way, an image is obtained which can be used by itself for several purposes, e.g. display on a monitor or weapon detection. It can also have several post-processing options before usage as mentioned above to obtain an image 6, depending on the application used. Post-processing can, for example, interpolation of the image.

In the following a couple of further embodiments and variations of the device and method according to the present invention will be explained by reference to FIGS. 6 to 11. For simplicity the blocks 20 and 6 are left out in these figures. This does, however, not mean that these elements do not exist in those embodiments.

Figure 6:
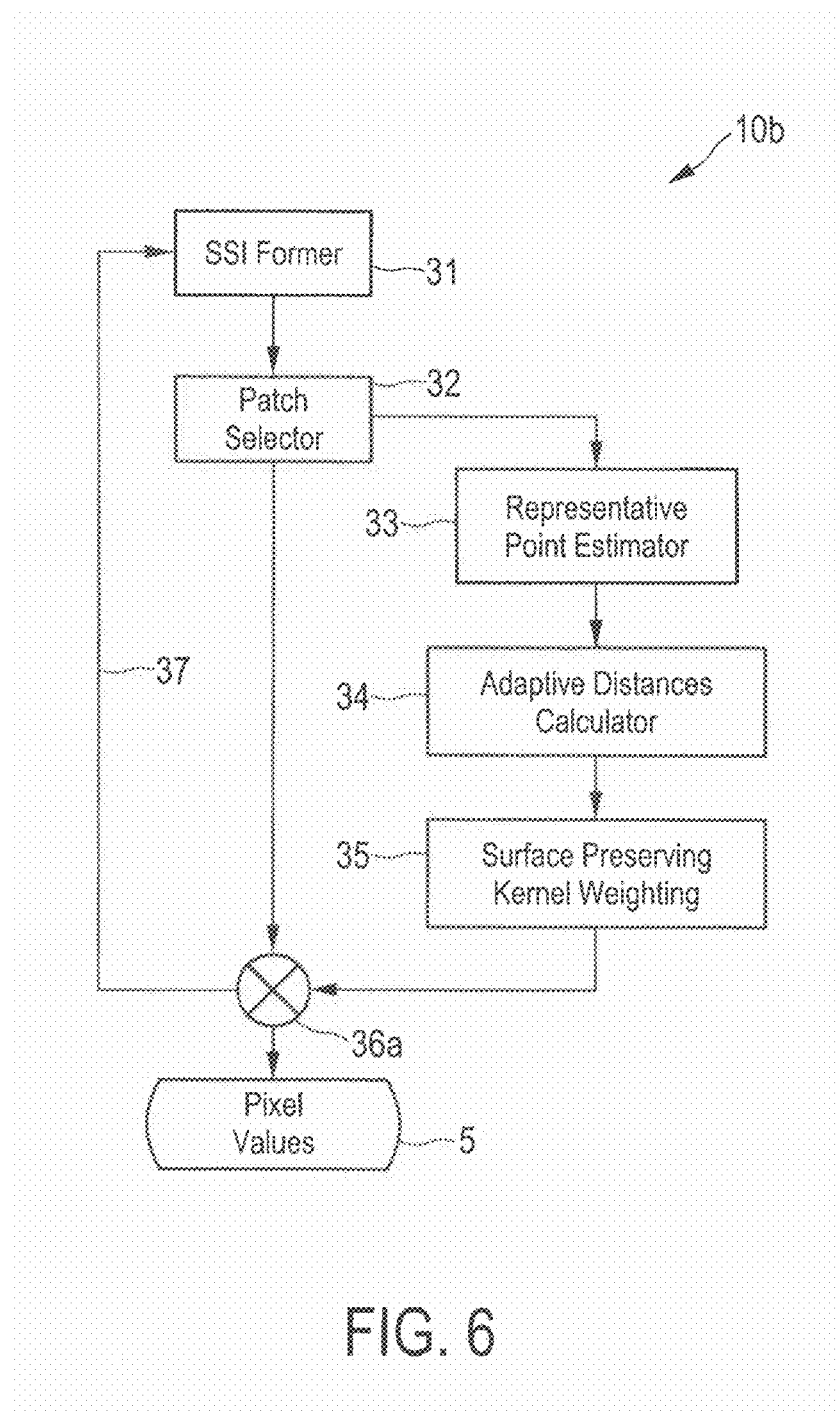
FIG. 6 shows a second embodiment of a device according to the present invention.

In one embodiment of the passive radiometric imaging device 10b shown in FIG. 6, the pixel value of the radiometric image is reconstructed by a convolution unit 36a for convolving the corresponding patch 8 (in particular the radiation samples of the patch 8) with the determined kernel (weights) from the processing unit. This pixel value is then preferably fed back via a feedback loop 37 to the SSI 7 to update it and use it in the computation of the subsequent pixel values of the other pixels of the radiometric image.

Figure 7:
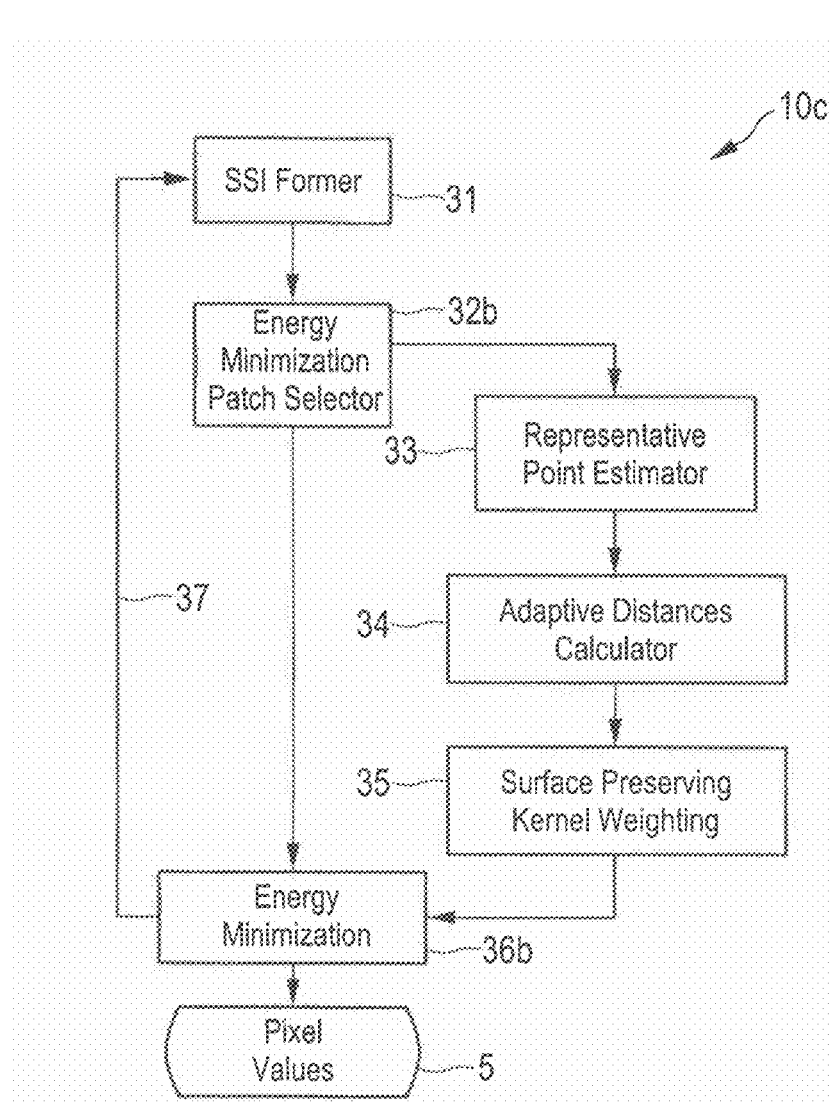
FIG. 7 shows a third embodiment of a device according to the present invention.
Figure 8:
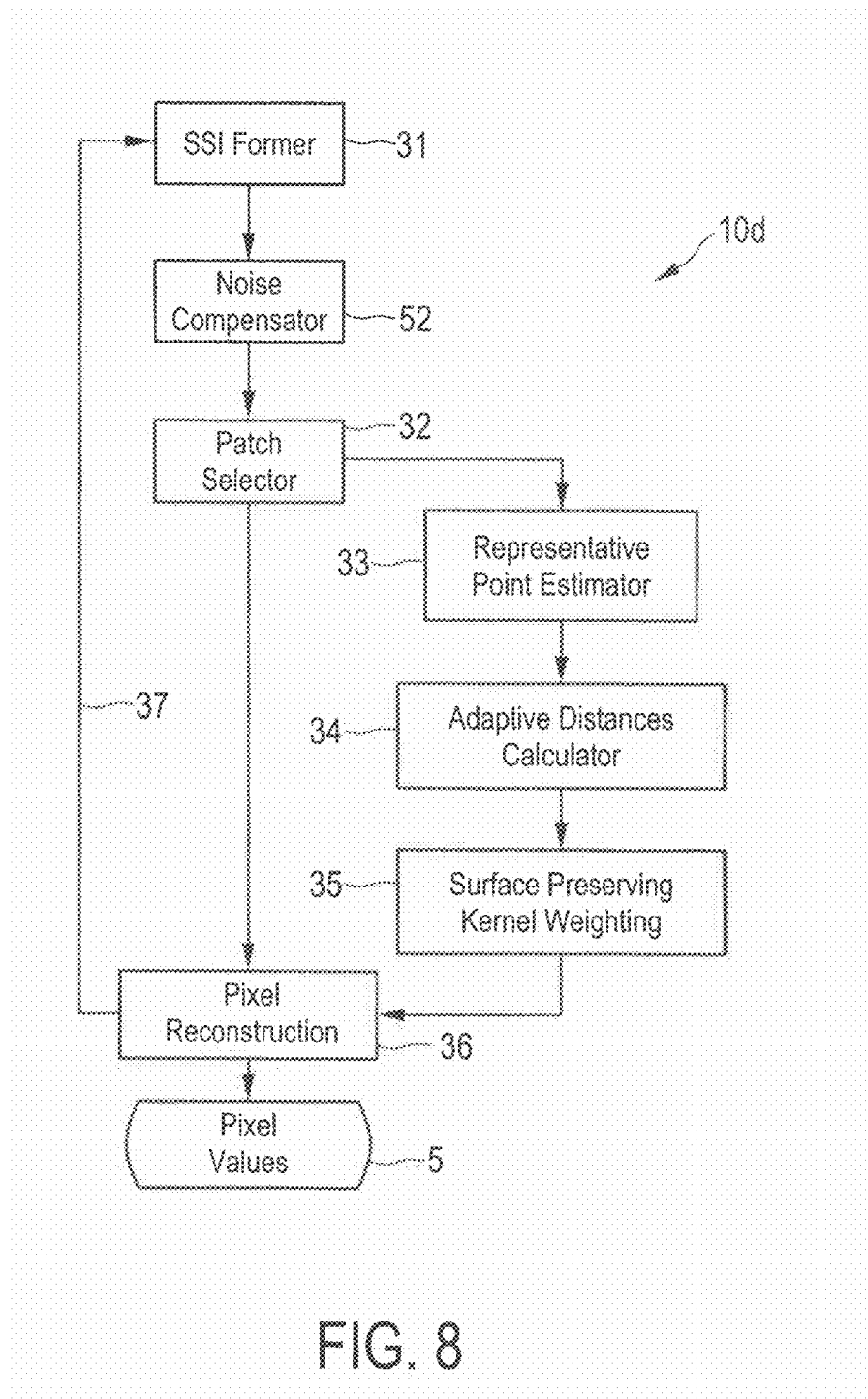
FIG. 8 shows a fourth embodiment of a device according to the present invention.

In the embodiment of the passive radiometric imaging device 10c shown in FIG. 7, the pixel of the radiometric image is not determined by a convolution as mentioned above, but the pixel reconstruction is performed by using the normalized kernel computed with Equation 6 with some energy minimization algorithms that take more surface and object structures into account in the energy minimization unit 36b. The patch upon which the distances are computed can be either selected in the energy minimization patch selector 32b as defined before or depending on the update done or the structure of the pixel reconstruction algorithm used. Some examples that can be used are belief propagation and graph cuts based optimization techniques where some example implementations are described for example in Y. Boykov, O. Veksler and R. Zabih, "Fast approximate energy minimization via graph cuts", IEEE Transactions on Pattern Analysis and Machine Intelligence, pp. 1222-1239, November 2001 and in F. Felzenszwalb and D. P. Huttenlocher, "Efficient Belief Propagation for Early Vision", International Journal of Computer Vision, pp. 41-54, October 2006. Belief propagation computes the pixels of the image by passing some messages that perform some inference on a graphical model of the samples in the SSI, such as Bayesian networks and Markov random fields, while graph cuts constructs the pixel of the image by finding the maximum flow of the samples in the SSI.

The energy minimization patch selector 32b could generally be identical to the patch selector 32, but the patch structure might have to be adapted in some case to the energy algorithm used, e.g. checkerboard update scheme in belief propagation as generally described in P. F. Felzenszwalb and D. P. Huttenlocher, "Efficient Belief Propagation for Early Vision", International Journal of Computer Vision, pp. 41-54, October 2006. The above examples are embodiments to reconstruct a pixel. In general, any pixel reconstruction algorithm that takes the weights and the pixels of the patch into account as shown here can be used to compute the pixel value. Further, reconstruction algorithms based on dynamic programming or swarm optimization and many other ones can also be used as well. These are described for illustration but not to limit the scope of this invention.

The radiation samples are in general noisy samples due to many internal and external factors and the weakness of the passive radiometric waves. The present invention copes in an embodiment with the noise by standardization or whitening of the sample values as a pre-processing step and by applying a locally adaptive surface preserving kernels on some patches to take the neighboring samples of the samples of the pixel under consideration in the computations. However, the noise of the radiometer 20 might not be sufficiently compensated depending on the environment where the measurements are made and the radiometer 20 itself. It is therefore preferred in another embodiment of a passive radiometric imaging device 10d shown in FIG. 8 to embed any noise or distortion compensation algorithm in a compensation unit 52 which acts on the sample values of the SSI 7. The compensation unit 52 can also be integrated at another location in the processing unit 30, depending on the algorithm used, e.g. after any one of the units 32 to 35.

Figure 9:
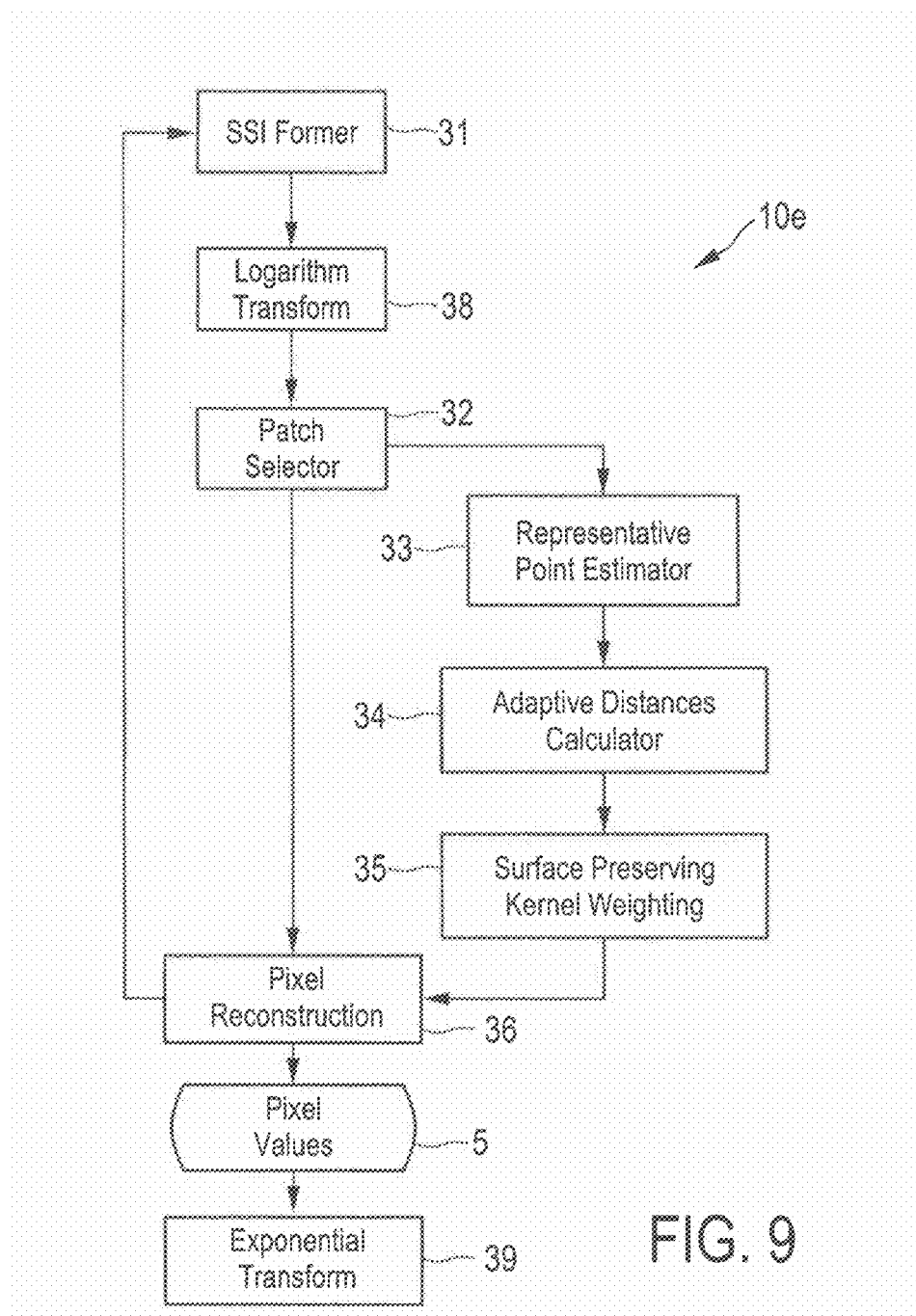
FIG. 9 shows a fifth embodiment of a device according to the present invention.
Figure 10:
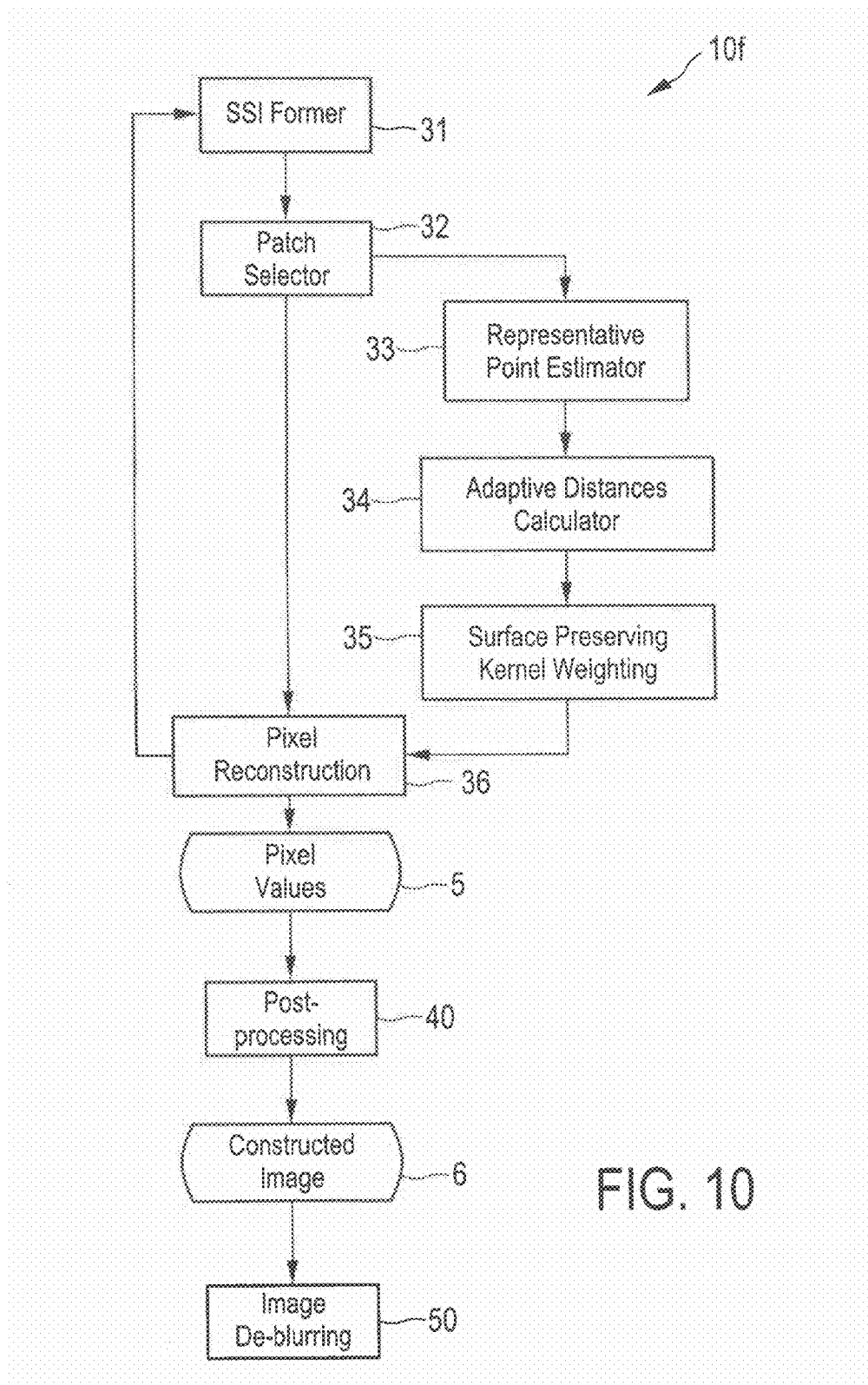
FIG. 10 shows a sixth embodiment of a device according to the present invention.
Figure 11:
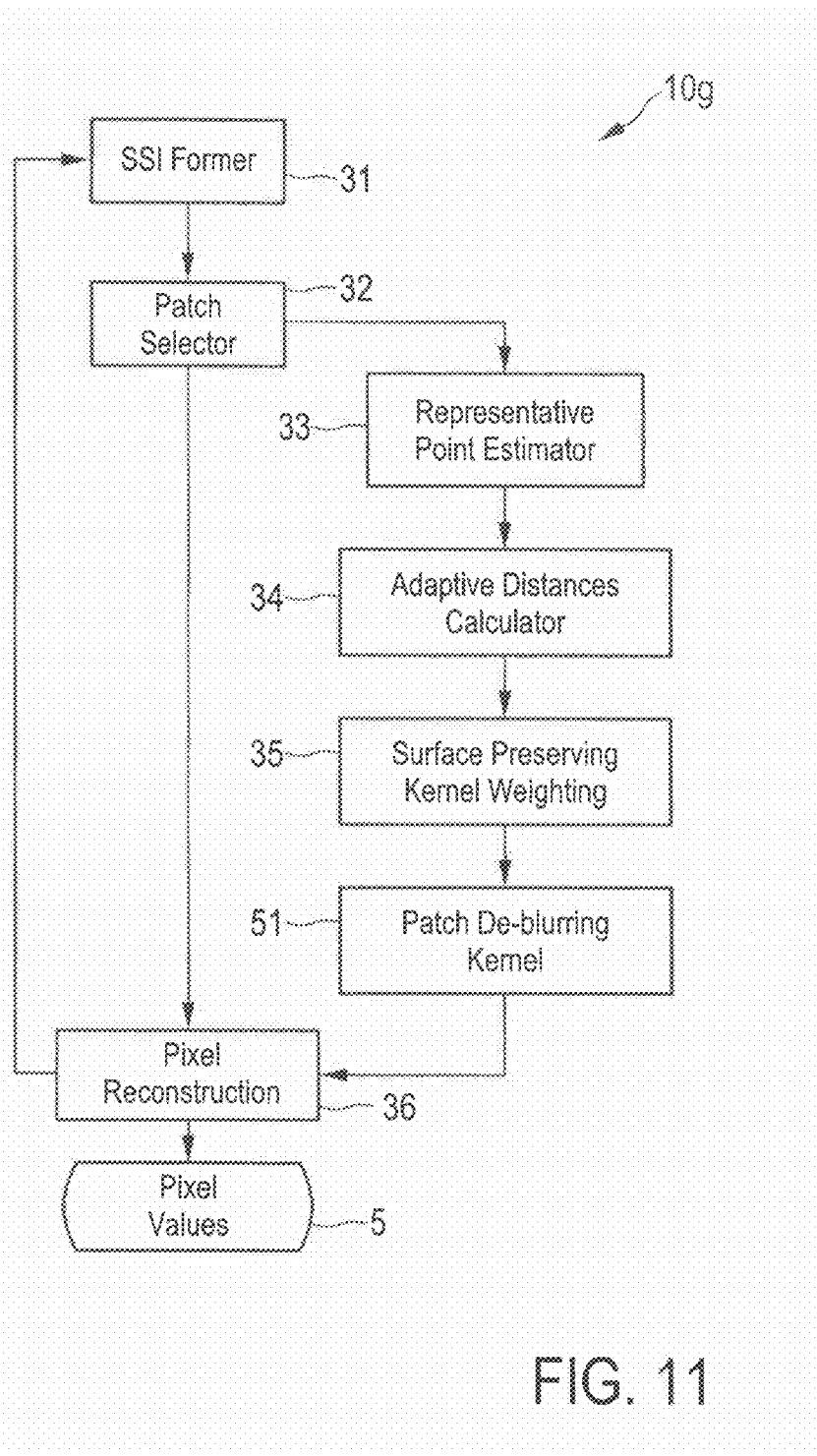
FIG. 11 shows a seventh embodiment of a device according to the present invention.

If the noise under consideration has a multiplicative form, the samples of the SSI 7 can be transformed with the logarithmic transform, preferably applying algorithm function on each radiation sample, before the main computation in the processing unit 30 starts. Once the computations are done, the final image can be restored using the exponential transform applied on the pixel values before image reconstruction. Such an embodiment of a passive radiometric imaging device 10e, that is applicable in the case of multiplicative noise, is shown in FIG. 9, according to which a logarithm transformer unit 38 is added after the SSI former 31 and an exponential transformer 39 is added after the pixel reconstruction unit 36. Other embodiments with the goal to reduce the noise in the samples are also possible depending on the type of noise under consideration and the noise or distortion compensation algorithm used. For example, Singular Value Decomposition (SVD) can be used to detect and reduce the noise in the samples of the radiometer. It should be understood that the noise compensation algorithm should be applied according to the present invention to the raw samples of the radiometer and not to the integrated image as is usually done in the state of the art.

Blurring can occur in the sampled measurement of the radiometer 20 due to the antenna pattern of the radiometer 20. It can also occur if the object under consideration is moving or from other factors. This effect can be compensated in the final reconstructed image by another embodiment of a passive radiometric imaging device 10f shown in FIG. 10 using a de-blurring algorithm in an image de-blurring unit 50. In other words, it can be done as a post-processing step or after applying the main steps of the present invention. In another embodiment of a passive radiometric imaging device 10g shown in FIG. 11 it is possible to compensate for the blurring at the same time the adaptive weights are computed in a patch de-blurring kernel unit 51, which—in a still further embodiment—can also be placed directly before the representative point estimator 33 or with the pixel reconstruction unit 36.

FIG. 12 shows the effect of the present invention by depicting images reconstructed using the invention and using conventional methods from the samples captured by a passive electromagnetic radiometer. Two images of a person were reconstructed with each method, in particular one image (shown in the top row) with a hidden gun and another image (shown in the bottom row) with a hidden metal plate. The samples of the radiometer were first standardized. Then, the SSI was reconstructed with a size of 200×200×256 corresponding respectively to the width of the image, the height of the image and the number of samples per pixel. The patch used in the computation of each pixel had a size 5×5×256. The resulting reconstructed images have a size of 200×200 pixels. The noise was assumed to be multiplicative so that the preferred embodiment of the invention for multiplicative noise shown in FIG. 9 was used. Each pixel value of the reconstructed image was obtained by convolving the kernel with the samples of the patch. The truncation value c used to compute the adaptive distances was set to 1. As a surface preserving kernel, the normalized multiquadric kernel of order 2n=10 as shown in Equations 4 and 6 where the constant l was also set to 1. FIG. 12A shows the result of integration over SSI using the whole 256 samples as done according to a known method, FIG. 12B shows the result of the method according to the present invention, FIG. 12C shows the results of integration and then a bilateral filtering scheme (as described in S. Paris and F. Durand, "A Fast Approximation of the Bilateral Filter using a Signal Processing Approach", in European Conference on Computer Vision, pp. 568-580, May 2006), and FIG. 12D shows the results of integration and then an anisotropic diffusion of scheme (as described in J. Weickert and H. Scharr, "A scheme for coherence-enhancing diffusion filtering with optimized rotation invariance," J. Visual Communication and Image Representation, pp. 103-118, March 2002). From these images it can directly be seen that the outcome of the invention has much more contrast, much less noise and the shapes of the objects are much more preserved and less varying than by using the other algorithms. This allows a better post-analysis of the radiometric image for various applications.

It shall be noted that other combinations of the elements described in the above embodiments are also possible according to the present invention. For instance, in the embodiment disclosed in FIG. 1 the processing means may be adapted for weighing the radiation samples of a data sub-set according to their similarity and for determining the pixel value of the pixel from the weighted radiation samples. Further, in said embodiment a patch selection unit may be provided for defining said data sub-set of radiation samples. As mentioned above, the size of a patch can be predefined and fixed or can be variable, for instance, depending on the location of the pixel whose pixel value is determined by use of said patch. Preferably, the size and/or form of the patch is adapted to include the largest possible area of similar radiation samples around a spot corresponding to or being closest to the pixel.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Passive radiometric imaging device for scanning a scene and reconstructing an image of said scene, said device comprising:
    a radiometer configured to detect radiation emitted in a predetermined spectral range from a plurality of spots of said scene to obtain a data set of radiation samples including at least one radiation sample per spot, and
    a processor configured to subsequently determine pixel values of pixels of the image to be reconstructed, said processor being configured to determine a pixel value of one of said pixels from a data sub-set of radiation samples from said data set, said data sub-set comprising a plurality of radiation samples including the radiation samples detected at the spot corresponding to or being closest to the pixel, whose pixel value is to be determined, and radiation samples detected at neighboring spots.

2. Passive radiometric imaging device as claimed in claim 1, wherein said processor is configured to weigh said radiation samples of a data sub-set according to their similarity and for determining the pixel value of the pixel from the weighted radiation samples.

3. Passive radiometric imaging device as claimed in claim 1 or 2, wherein said processor comprises a patch selection unit configured to define said data sub-set of radiation samples from said data set, said patch selection unit being configured to define said sub-set by using a window having a predetermined size and/or form around the spot corresponding to or being closest to the radiation samples of the pixel, whose pixel value is to be determined.

4. Passive radiometric imaging device as claimed in claim 1 or 2, wherein said processor comprises a patch selection unit configured to define said data sub-set of radiation samples from said data set, said patch selection unit being configured to define said sub-set by using a window having variable size and/or form around the spot corresponding to or being closest to the pixel, wherein the size and/or form of the window is varied depending on the location of the radiation samples of the pixel, whose pixel value is to be determined.

5. Passive radiometric imaging device as claimed in claim 4, wherein said patch selection unit is configured to vary the size and/or form of the window so as to include the largest possible area of similar radiation samples around the spot corresponding to or being closest to the radiation samples of the pixel, whose pixel value is to be determined.

6. Passive radiometric imaging device as claimed in claim 1 or 2, wherein said processor comprises a representative point estimation unit configured to determine at least one representative point for the radiation samples of said data sub-set being representative for said radiation samples, a distance calculation unit configured to determine distances of the radiation samples of said data sub-set from said at least one representative point, a weighing factor calculation unit configured to determine weights for the radiation samples of said data sub-set based on the determined distances, wherein radiation samples having a smaller distance obtain a higher weight than radiation samples having a larger distance, and a pixel value reconstruction unit configured to determine the pixel value from the radiation samples and their corresponding weights.

7. Passive radiometric imaging device as claimed in claim 6, wherein said representative point estimation unit is configured to determine said at least one representative point as the magnitude of the centroid, the average, the median and/or the magnitude of the median of the radiation samples of the data sub-set.

8. Passive radiometric imaging device as claimed in claim 6, wherein said distance calculation unit is configured to determine a distance of a radiation sample of said data sub-set from said representative point as the magnitude of the difference between the radiation sample and the representative point, the square of the difference between the radiation sample and the representative point or the root of said square.

9. Passive radiometric imaging device as claimed in claim 6, wherein said distance calculation unit is configured to regularize the determined distances, in particular for truncating the determined distances, and said weighing factor calculation unit is configured to determine weights for the radiation samples using the truncated distances.

10. Passive radiometric imaging device as claimed in claim 9, wherein said distance calculation unit is configured to truncate the determined distances based on a truncation value, that is predetermined or that is varied depending on the location of the radiation samples of the data sub-set.

11. Passive radiometric imaging device as claimed in claim 6, wherein said weighing factor calculation unit is configured to determine the weight for a radiation sample based on its similarity to the representative point, in particular by assigning a higher weight with increasing similarity.

12. Passive radiometric imaging device as claimed in claim 6, wherein said weighing factor calculation unit is configured to determine the weight $K_i$ for a radiation sample by $$K_i = \frac{Q}{f(d)} \text{ or } K_i = \frac{Q}{f(\hat{d})}$$

wherein Q is a scalar or a function of the distance d or the truncated distance $\hat{d}$, respectively, and f(d) is a function of the distance d and $f(\hat{d})$ is a function of the truncated distance $\hat{d}$.

13. Passive radiometric imaging device as claimed in claim 6, wherein said weighing factor calculation unit is configured to determine the weight for a radiation sample by determining the general multiquadratic spline smoothing kernel, in particular by determining the multiquadric spline kernel $K_i$ at a radiation $X_i$ as a function of the truncated distance $\hat{d}_i$ by $$K_i = n \cdot A(n) \cdot l^{2n} \cdot \left(\hat{d}_i^2 + l^2\right)^{-\frac{2n-1}{2}},$$

wherein l is a pre-defined constant, n is a positive integer, 2n is the order of the multiquadric spline and A is the function defined by $$A(n) = \frac{(2n-1)!!}{2n!!} = \frac{1 \times 3 \times 5 \times \ldots \times (2n-1)}{2 \times 4 \times 6 \times \ldots \times (2n)}.$$

14. Passive radiometric imaging device as claimed in claim 6, wherein said pixel reconstruction unit is configured to determine the pixel values of the image by a convolution of the radiation samples with their corresponding weights.

15. Passive radiometric imaging device as claimed in claim 6, wherein said reconstruction unit is configured to determine the pixel values of the image by an energy minimization algorithm using the radiation samples and their corresponding weights.

16. Passive radiometric imaging device as claimed in claim 1 or 2, wherein said processor is configured to update said data set of radiation samples by replacing all radiation samples detected at a spot corresponding to or being closest to a pixel by the pixel value of said pixel after it has been determined and to use the updated data set for the subsequent determination of pixel values.

17. Passive radiometric imaging device as claimed in claim 1 or 2, further comprising a compensation unit configured to compensate noise or distortions in the radiation samples and/or to compensate blurring of an antenna pattern in the radiation samples.

18. Passive radiometric imaging device as claimed in claim 17, wherein said compensation unit comprises
a logarithm transformer configured to take the logarithm of the radiation samples before processing said radiation samples and by the processing unit and
an exponential transformer configured to take the exponent of the determined pixel values before reconstructing the image there from.

19. Passive radiometric imaging method for scanning a scene and reconstructing an image of said scene, said method comprising the steps of:
detecting radiation emitted in a predetermined spectral range from a plurality of spots of said scene to obtain a data set of radiation samples including at least one radiation sample per spot, and
subsequently determining pixel values of pixels of the image to be reconstructed, said processor being configured to determine a pixel value of one of said pixels from a data sub-set of radiation samples from said data set, said data sub-set comprising a plurality of radiation samples including the radiation samples detected at the spot corresponding to or being closest to the pixel, whose pixel value is to be determined, and radiation samples detected at neighboring spots.

20. Processing apparatus for use in a passive radiometric imaging device for scanning a scene and reconstructing an image of said scene, said processing apparatus comprising a processor for subsequently determining pixel values of pixels of the image to be reconstructed, said processor being configured to determine a pixel value of one of said pixels from a data sub-set of radiation samples from a data set of radiation samples including at least one radiation sample per spot, said radiation samples being obtained by detecting radiation emitted in a predetermined spectral range from a plurality of spots of said scene, wherein said data sub-set comprises a plurality of radiation samples including the radiation samples detected at the spot corresponding to or being closest to the pixel, whose pixel value is to be determined, and radiation samples detected at neighboring spots.

21. Processing method for use in a passive radiometric imaging device for scanning a scene and reconstructing an image of said scene, said processing method comprising the step of subsequently determining pixel values of pixels of the image to be reconstructed, wherein a pixel value of one of said pixels is determined from a data sub-set of radiation samples from a data set of radiation samples including at least one radiation sample per spot, said radiation samples being obtained by detecting radiation emitted in a predetermined spectral range from a plurality of spots of said scene, wherein said data sub-set comprises a plurality of radiation samples including the radiation samples detected at the spot corresponding to or being closest to the pixel, whose pixel value is to be determined, and radiation samples detected at neighboring spots.

22. Computer program comprising program code means for causing a computer to perform the steps of said processing method as claimed in claim 21 when said computer program is carried out on said computer.

23. Passive radiometric imaging device for scanning a scene and reconstructing an image of said scene, said device comprising:
a radiation detection means for detecting radiation emitted in a predetermined spectral range from a plurality of spots of said scene to obtain a data set of radiation samples including at least one radiation sample per spot, and
a processing means for subsequently determining pixel values of pixels of the image to be reconstructed, said processing means being adapted for determining a pixel value of one of said pixels from a data sub-set of radiation samples from said data set, said data sub-set comprising a plurality of radiation samples including the radiation samples detected at the spot corresponding to or being closest to the pixel, whose pixel value is to be determined, and radiation samples detected at neighboring spots.

24. Processing apparatus for use in a passive radiometric imaging device for scanning a scene and reconstructing an image of said scene, said processing apparatus comprising a processing means for subsequently determining pixel values of pixels of the image to be reconstructed, said processing means being adapted for determining a pixel value of one of said pixels from a data sub-set of radiation samples from a data set of radiation samples including at least one radiation sample per spot, said radiation samples being obtained by detecting radiation emitted in a predetermined spectral range from a plurality of spots of said scene, wherein said data sub-set comprises a plurality of radiation samples including the radiation samples detected at the spot corresponding to or being closest to the pixel, whose pixel value is to be determined, and/or radiation samples detected at neighboring spots.

* * * * *